United States Patent

[11] 3,598,469

| [72] | Inventor | William J. Landen<br>New Haven, Conn. |
|---|---|---|
| [21] | Appl. No. | 1,127 |
| [22] | Filed | Jan. 7, 1970 |
| [45] | Patented | Aug. 10, 1971 |
| [73] | Assignee | Landen Corporation<br>Cheshire, Conn. |

[54] MIRROR FRAME
12 Claims, 7 Drawing Figs.

[52] U.S. Cl.................................................. 350/63,
350/288
[51] Int. Cl.................................................. G02b 5/08
[50] Field of Search........................... 350/63, 61,
62; 15/313; 296/1 S, 91

[56] References Cited
UNITED STATES PATENTS
1,072,828  9/1913  Cummings................... 350/63

| 3,021,757 | 2/1962 | Ellis | 350/62 |
| 3,059,540 | 10/1962 | Robinson | 350/63 |
| 3,102,338 | 9/1963 | Warriner | 350/63 X |

*Primary Examiner*— David Schonberg
*Assistant Examiner*— Robert L. Sherman
*Attorney*— Delio and Montgomery ABSTRACT: This disclosure relates to a frame for automobile rearview mirrors which is constructed and arranged for the removal of moisture from the face of a mirror mounted in the frame. The frame is so constructed that when air impinges thereon, a region of low pressure is established along one or more edges thereof. Moisture on the face of the mirror will then move across the face of the mirror toward the region of low pressure and will be removed from the face of the mirror.

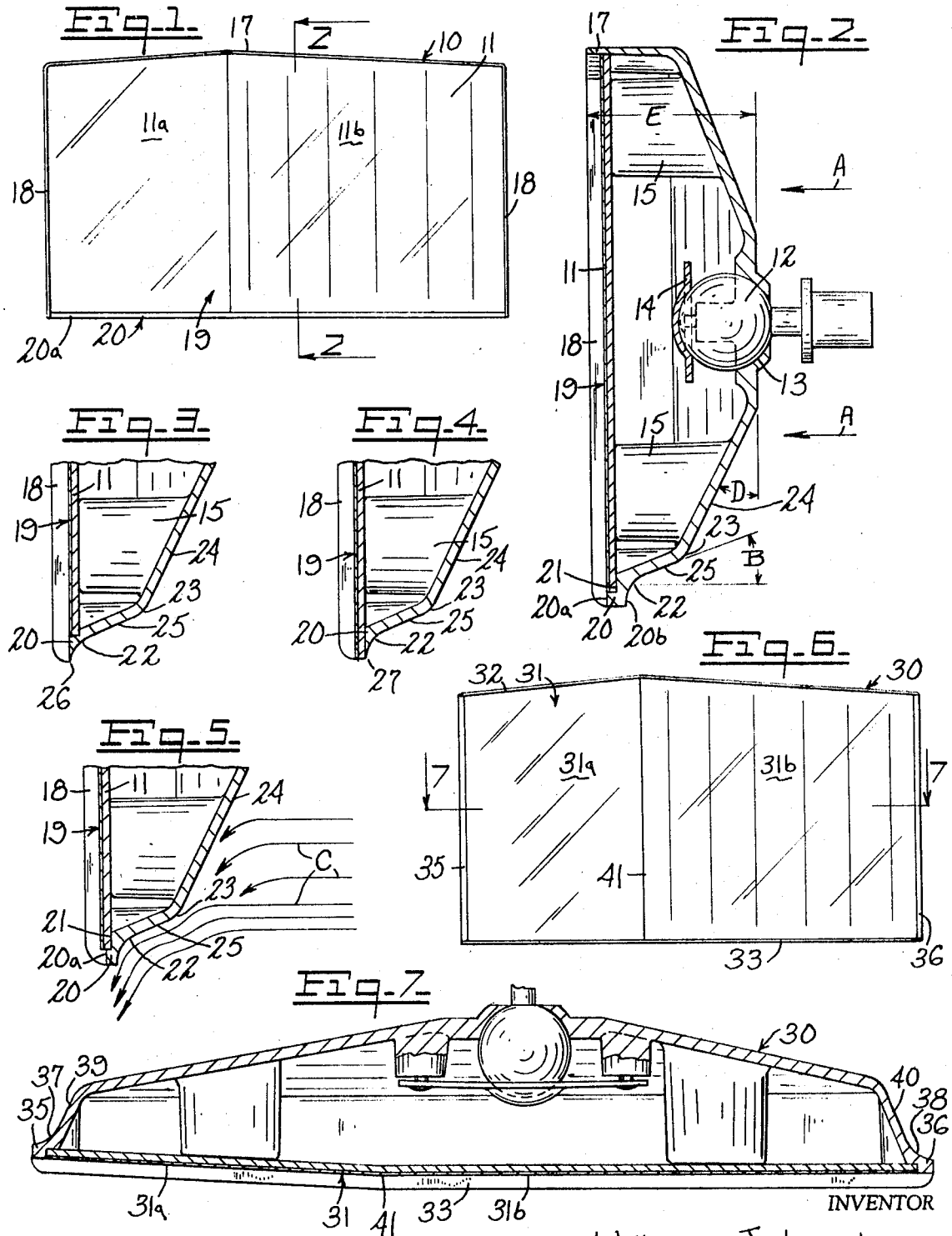

MIRROR FRAME

This invention relates to a support frame for a mirror, and particularly to a support frame which provides for self-cleaning of moisture from the face of the mirror.

During times of precipitation, moisture will collect on the exposed face of automobile rearview mirrors and will even collect on those which have somewhat of a shroud about the face of the mirror. This impairs the reflecting capabilities of the mirror and can introduce distortion into the images attempted to be viewed therein. In inclement weather, the driver of an automobile may frequently be forced to either stop the vehicle to clean the rearview mirror or continually roll down the window to wipe it off. In either case, a safety problem is presented as well as great inconvenience to the driver.

The prior art reveals that this problem has previously been recognized and a number of attempts have been made to overcome construction In one example, an air deflector plate has been attached to a rearview mirror to deflect air over the viewing surface of the mirror so as to remove any foreign matter thereon. This is rather an unsightly device, may block a portion of the viewing surface of the mirror and, further, would extend the overall length of the mirror. It has further been proposed to mount a mirror so that it rotates when air impinges on the back thereof so as to throw off moisture and other foreign material radially outwardly from the face of the mirror. This type of construction is rather expensive and relatively complex in requiring the rotating mounting and further requires a rather expensive frame construction having a multiplicity of impeller blades to produce rotation of the mirror. Another suggestion has been to make a circular mirror frame with an annular air trap all around so that air is directed radially inwardly from the entire periphery of the mirror. This device, if operative, would concentrate all moisture and other foreign matters in the center of the mirror and produce a traffic hazard which may be of lesser or greater concern than the original problem.

The devices proposed in the prior art are relatively expensive to construct and have other deficiencies as pointed out above.

Accordingly, it is an object of the present invention to provide a new and improved support for an automobile rearview mirror which allows the face of the mirror to be self-cleaning of moisture.

An object of this invention is to provide a support frame for an automobile rearview mirror which allows the face of the mirror to be self-cleaning of moisture and is inexpensive and simple in construction.

A further object of the invention is to provide a support frame for an automobile rearview mirror which efficiently and automatically keeps the face of an automobile rearview mirror free from moisture without the use of any moving parts or external attachments.

Still another object of this invention is to produce a support frame for an automobile rearview mirror in which the air pressure about a portion of the periphery of the mirror is reduced so as to create air movement over the face of the mirror to sweep moisture therefrom.

Briefly stated, the invention in one form thereof comprises a mirror frame wherein the portion of the frame is so relieved that it extends no further than the front face of the mirror. The frame of the mirror behind this portion is so shaped and contoured that air impinging on the mirror is deflected downwardly past this portion and creates a low-pressure area extending along that portion of the mirror.

The features of the invention which are believed to be novel are particularly pointed out and definitely claimed in the concluding portion of this specification. The invention, however, both as to its organization and operation, together with further objects and advantages thereof may best be appreciated by reference to the following detailed description taken in conjunction with the drawings, in which:

FIG. 1 is a front view of an automobile rearview mirror including a frame embodying the invention;

FIG. 2 is a view seen in the plane of lines 2—2 of FIG. 1;

FIGS. 3, 4 and 5 are views similar to FIG. 2 but showing only a portion of the cross-sectional view shown in FIG. 2 which illustrate alternate arrangements embodying the invention;

FIG. 6 is a front elevational view of an automobile rearview mirror; and

FIG. 7 is a view seen in the plane of line 7—7 of FIG. 6.

FIG. 1 exemplifies a frame 10 supporting an automobile rearview mirror 11 as disclosed and claimed in copending application, Ser. No. 685,228, now U.S. Pat. No. 3,501,227.

A frame embodying the present invention may be utilized either with the conventional single-plane mirror or the dual-plane mirror as exemplified. For adjustment purposes, the frame 10 carries a swivel ball 12 between a seat 13 in the frame and a plate 14 held in a predetermined position by the frame as more clearly exemplified in FIG. 7.

The frame 10 may be formed with projecting members 15 to which the mirror is bonded or otherwise attached to the frame. Attached to the ball 12 is a mounting device 16 adapted to be mounted to or forming part of the conventional support arm for an automobile rearview mirror. When mounted or an automobile that is in motion, air will be directed against the back of the frame as indicated by the arrows A.

In the illustrated embodiment of the invention the frame is provided with a top flange 17 and side flanges 18 which extend beyond the front face 19 of mirror 11. However, along the lower portion of frame 10 is provided a margin portion 20 having a seat 21 defined therein such that the lower peripheral portion of mirror 11 is received and seated therein with the face 19 extending at least flush with the face 20a of margin portion 20.

One portion of the periphery of the mirror frame is formed to produce an elongated area of reduced air pressure when air, as indicated by the arrows A, impinges on the back of the frame due to movement of the vehicle on which the mirror is mounted. When this elongated area of low pressure is created adjacent the margin portion 20, the atmospheric pressure existing along the face of the mirror will force any moisture thereon to run downwardly towards margin 20 and off the face of the mirror. To this end, the face 19 of mirror 11 is always at least flush with the face 20a of margin 20.

To create the region of low pressure, the air impinging on the back of the mirror is caused to travel a greater distance after impingement at a higher velocity and, accordingly, reduced pressure.

The frame is so formed along the bottom portion thereof adjacent margin 20 as to produce a higher velocity of airstream in margin 20 without creating undue turbulence. To accomplish this, the back surface of margin 20 is smoothly curved as by a radius or curvature 22 to a surface 25 into a predetermine angle B. Surface 25 forms an acute angle B with a plane perpendicular to the vertical plane defining angle D with surface 24. The angle B and the radius or curvature 22 is so selected that the air impinging on the lower back surface of the frame will be directed downwardly past margin 20 at an increased velocity and create an area of low pressure extending across the bottom of margin 20. The preferred range for the angle B is 25° to 40°, and more preferably 25° to 35°, partially dependent upon the angle defined by the back surface 24 with the vertical plane.

As the angle B decreases below 25° an insufficient volumetric rate of air is directed at the curvature 22. As the angle B increases beyond 35°, a turbulent effect will be created which increases with a greater angle which will tend to destroy a streamlined flow of air, as exemplified by the arrows C in FIG. 5. The construction shown in FIG. 5 is identical to that shown in FIG. 2 with the exception that the face 19 of mirror 11 extends slightly beyond the face 20a of margin 20.

FIG. 3 exemplifies another alternate construction where the back and front of the lower margin terminate in an edge 26.

FIG. 4 exemplifies a construction where the face of margin 20 terminates in an edge 27 where the back of mirror 11 abuts thereon.

For production purposes it has been found that it is less difficult to make the margin 20 as shown in FIG. 2. However, the thickness of the margin should be kept to a minimum in order to achieve the desired effect due to the reduction in pressure at the bottom of the mirror frame. Accordingly, it is preferred that the dimension between the surfaces 20a and 20b across the bottom flat portion of margin 20 not exceed three thirty-seconds of an inch at the point of minimum thickness. It is further preferred that the curvature 22 from the surface 25 into back surface 20b of margin 20 have a radius of one-eighth of an inch or greater to insure that no undesirable turbulence is created at the rear face 20b of the margin.

As shown, the margin 20 may be formed in various configurations and, where the mirror 11 may have its front surface 19 project beyond the front face 20a of the margin, it is preferred that the dimension between the back of the margin and the front face of the mirror essentially meet the foregoing specifications.

To further insure streamlined airflow along the back of the frame it has been found that the angle D should be no less than 10°. This angle may be greater and will vary with the angle B. The radius or curvature 23 where surface 25 merges into surface 24 should be selected such that there is no sharp edge which will cause turbulence in the flow of air along the back and down toward radius or curvature 22. In the case of a mirror frame that has an overall dimension E of 1⅛ inch it is found that for optimum results the angle D should be no less than 10°, the curvature 23 should have a radius of no less than three-eighths of an inch and the angle B should be within the aforementioned 25° to 35° range. These dimensions may, of course, vary with the overall dimensions and particularly the depth E of mirror frame 10.

The frame 10 may be constructed of any desired material. For example, it may be molded plastic, die-cast aluminum, white metal, etc.

It will be noted that the portion of the mirror frame of FIGS. 1—5 is along the lower periphery thereof. For this reason, gravity would not interfere, and in fact will aid the self-cleaning effect of the mirror frame construction. It will be understood that while the mirror 11 comprises two planes 11a and 11b disposed at a large obtuse angle with respect to each other as disclosed in the aforementioned copending application, the mirror may be of the conventional single-plane type. Additionally, the mirror may have an annular or round periphery and the frame therefor formed in accordance with the invention about a predetermined portion of the periphery.

Another mirror frame embodying the invention is exemplified in FIGS. 6 and 7 by the frame 30 with mirror 31 therein having planes 31a and 31b. The frame has an upper flange 32 and a lower flange 33 which extend beyond the faces. The frame 30 and mirror 31 are constructed and arranged with marginal portions 35 and 36 extending along either side thereof. The margins 35 and 36 are formed with the curvatures 37 and 38 therebehind merging into surfaces 39 and 40, respectively, in the same manner as exemplified in FIGS. 2—5. The same specifications set forth for the embodiment shown in FIG. 2 would hold for the embodiment shown in FIG. 7. In FIG. 7 the moisture would travel laterally across the faces of mirror 31 from the line of intersection 41 of the two planes.

From the foregoing it may be seen that the invention provides a simply constructed mirror frame which is self-cleaning from the standpoint of moisture on the face thereof and also would be self-cleaning from the standpoint of particles, dirt, dust, etc. on the face of the mirror which did not have much adhesion to the surface thereof.

It may thus be seen that the objects of the invention set forth as well as those made apparent from the preceding description are efficiently attained. Inasmuch as other embodiments of the invention may occur to others skilled in the art, the appended claims are intended to cover all modifications of the disclosed embodiments of the invention as well as other embodiments thereof.

What I claim is:

1. A support frame for an automobile rearview mirror adapted to be mounted to the outside of the automobile, said frame having means for mounting a mirror thereon, the periphery of said frame including at least one margin portion extending no further than the front surface of a mirror mounted to said frame, the back of said frame behind said margin portion having a first first surface disposed at an acute angle to a first vertical plane and a second surface disposed at an acute angle to a second plane perpendicular to the first plane, a first curvature joining said first and second surfaces, said second surface extending to said peripheral portion at a second curvature so that when air impinges on the back of said frame behind said margin portion, it is directed past said margin portion at an increased velocity and reduced pressure with respect to the remainder of the periphery of said frame.

2. The frame of claim 1 wherein said peripheral portion is at the lower portion of said frame.

3. The frame of claim 1 wherein said frame is so formed that the first surface is disposed at an angle no less than 10° to the first vertical plane and the second surface is disposed at angle of 20°—40° with the second plane.

4. The frame of claim 3 wherein said first curvature is no less than ⅜-inch radius.

5. The frame of claim 3 wherein said second curvature is no less than ⅛-inch radius.

6. The frame of claim 3 wherein the periphery of said frame is generally rectangular and said margin portion extends along the bottom thereof.

7. The frame of claim 3 wherein the periphery of said frame is generally rectangular and said frame has two of said margin portions, said margin portions being at opposite sides of said frame.

8. The frame of claim 1 wherein said margin portion defines a seat for an edge of the mirror and said edge of the mirror is received in said seat with the front surface of said margin extending no further than the front surface of the mirror.

9. The frame of claim 1 wherein said margin abuts the rear surface of the mirror.

10. The frame of claim 1 wherein the distance between the face of the mirror and the rear of said margin is no greater than one-fourth inch at the extreme edge of said margin.

11. The frame of claim 3 wherein the distance between the face of the mirror and the rear of said margin is no greater than one-fourth inch at the extreme edge of said margin.

12. The frame of claim 1 further including a mirror mounted therein wherein said mirror has two viewing surfaces on an integral body.